United States Patent [19]

Padoan

[11] 4,220,883
[45] Sep. 2, 1980

[54] STATOR CORE FOR ELECTRIC MOTOR WITH TRANSFORMER COIL OR THE LIKE INCORPORATED THEREIN BUT MAGNETICALLY ISOLATED THEREFROM

[76] Inventor: Dante Padoan, Via G Pascoli, 5, 22030 Lipomo, Italy

[21] Appl. No.: 941,317

[22] Filed: Sep. 11, 1978

[30] Foreign Application Priority Data

Nov. 7, 1977 [IT] Italy .............................. 22654/77[U]

[51] Int. Cl.² ............................................. H02K 1/12
[52] U.S. Cl. .................................. 310/216; 310/258; 310/184
[58] Field of Search ............... 310/68 R, 72, 180, 184, 310/185, 187, 191, 194, 216, 218, 254, 256, 258, 259

[56] References Cited

U.S. PATENT DOCUMENTS

| | | | |
|---|---|---|---|
| 814,740 | 3/1906 | Smith | 310/189 X |
| 1,361,546 | 12/1920 | Politowski | 310/185 X |
| 1,641,548 | 9/1927 | Oswald | 310/216 X |
| 2,500,191 | 3/1950 | Lee | 310/258 X |
| 3,243,688 | 3/1966 | Brundage | 310/258 X |
| 3,341,723 | 9/1967 | Tourtellot | 310/68 R |
| 3,358,165 | 12/1967 | Grosu | 310/185 |
| 3,436,574 | 4/1969 | Larsson | 310/216 X |
| 3,441,760 | 4/1969 | Collins | 310/259 X |
| 4,002,936 | 1/1977 | Laing | 310/184 X |
| 4,134,035 | 1/1979 | Donahoo | 310/216 X |

Primary Examiner—Mark O. Budd
Attorney, Agent, or Firm—Polster, Polster and Lucchesi

[57] ABSTRACT

The stator core assembly for an electric motor, particularly such a motor in which operating characteristics of the motor is accomplished by means of a secondary coil, such as a choke coil. The stator core assembly comprises a plurality of laminations made of suitable magnetic material with the laminations assembled in a stack to form a core having a central bore extending longitudinally therethrough for the reception of a rotor of the electric motor and having a plurality of slots extending longitudinally through the core for receiving coils of wire which constitute the windings of the motors. Each of the laminations further has other openings therein so that upon the laminations being stacked in a core, the other openings form a receptacle for the reception of the above-mentioned secondary coil.

8 Claims, 2 Drawing Figures

STATOR CORE FOR ELECTRIC MOTOR WITH TRANSFORMER COIL OR THE LIKE INCORPORATED THEREIN BUT MAGNETICALLY ISOLATED THEREFROM

BACKGROUND OF THE INVENTION

This invention relates to the construction of a stator core assembly for an electric motor, and more particularly to the construction of a stator core assembly for an AC induction motor which either utilizes a choke coil for multi-speed operation or an auto-transformer for reduced voltage starting purposes.

Generally, multi-speed motors are well-known and are widely used, particularly for such applications in small appliances and the like. A first type of multi-speed motor uses different sets of stator poles electrically separate from one another. When the first set of poles in energized, the motor will operate at one speed depending on the number of poles and frequency of the excitation of the poles, and when the second set of poles is energized, the motor will operate at another speed. For example, a motor may have one set of windings with four poles for high speed operation and another set of windings with six poles for slower speed operation. However, the necessity of providing the multiple sets of windings in the stator assembly requires that the coil receiving slots in the core be of increased size so as to be able to receive the multiple coils. These increased sized slots necessitate that the lamination teeth between the slots be of reduced size thus requiring the magnetic circuit formed by the stator to operate with minimum core dimensions.

A second type of multi-speed motor uses one or more choke coils electrically connected with the main windings of the motor. The inductance of this choke control may be varied so as to have a desired speed control effect on the motor by choking the flux of the main winding. While this type of speed control does away with the need of having multiple sets of poles and windings inserted in the stator core, it does require the provision of a separate choke coil and core in addition to the main windings and core of the motor.

Also, other motors utilize an auto-transformer for reduced voltage starting. This auto-transformer typically includes an auto-transformer coil having a reduced voltage tap. Upon starting, the main windings are energized by the reduced voltage tap and once the motor accelerates to a predetermined speed, the main windings are energized by the line voltage.

It will be appreciated that the necessity of having to provide a separate secondary coil, for either (i.e., separate coil) a choke coil or a separate auto-transformer coil significantly increases the complexity and size of the motor and thus adds to the cost of the motor. For example, the requirement of a separate choke coil or auto-transformer coil requires additional manufacturing operations including the stamping of the laminations for this additional coil, the separate coil winding and insulating operations, and installing the coil within the motor. It has also heretofore been a difficult problem to find adequate space within the motor to enclose a separate secondary coil and to adequately support it within the motor.

SUMMARY OF THE INVENTION

Among the several objects and features of this invention may be noted the provision of a stator core assembly for an electric motor which incorporates both the motor windings for and secondary coil, such as a choke coil, on the same stator core;

The provision of a stator core which eliminates many of the manufacturing steps necessary to produce a separate secondary coil and to install the latter in the motor;

The provision of such a stator core which optimizes the use of core material for both the main windings of the motor and for the secondary coil;

The provision of such a stator core assembly which results in a small and compact motor;

The provision of such a stator core in which the secondary coil is protected within the motor;

The provision of such a stator core in which, after winding of the motor windings and the secondary windings of the stator assembly, all of the windings may be simultaneously insulated in one dip and bake operation;

The provision of such a motor stator core assembly in which only one lamination forming operation need be carried out to fabricate the laminations for both the main winding core and for the secondary winding core; and The provision of such a stator core assembly which is reliable and efficient in operation.

Briefly, this invention relates to a stator assembly for an electric motor and more particularly to an electric motor which has a secondary coil for varying operating characteristics of a motor, or the like. The stator assembly of this invention comprises a plurality of laminations made of a suitable plate-like magnetic material, each of the laminations being so structured so that with the laminations assembled in a stack they form a bore for reception of a rotor and means for receiving coils of wire which constitute the windings of the motor, each of said laminations further having other openings therein so that upon the laminations being stacked in a core said other openings form a receptacle for reception of said secondary coil.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
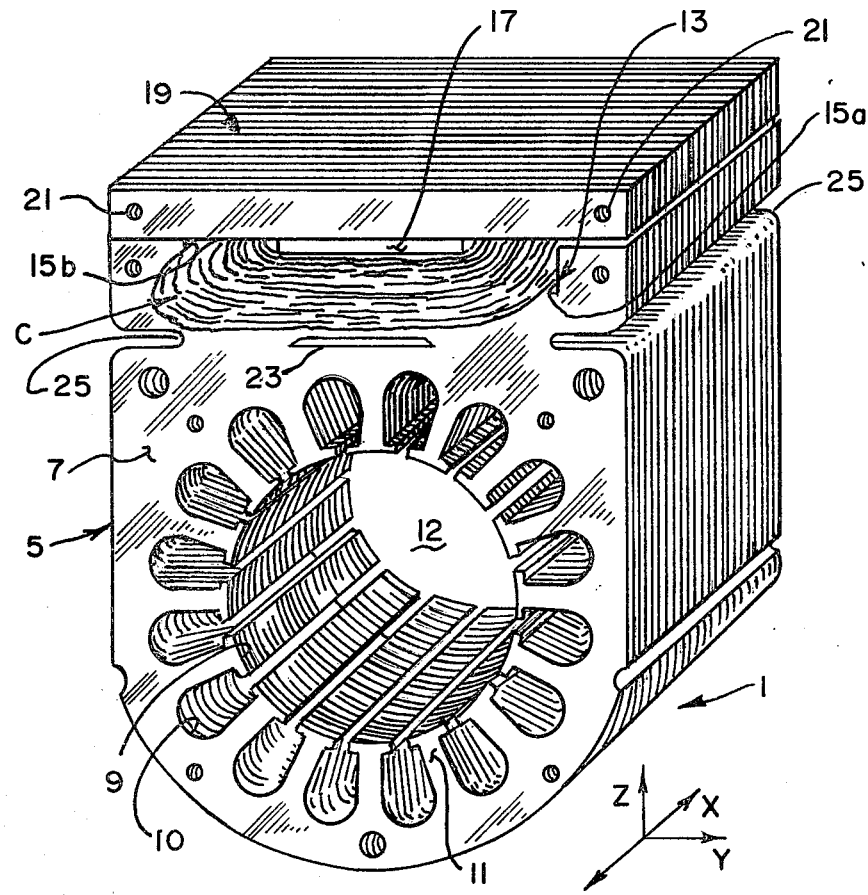
FIG. 1 is a perspective view of a plurality of laminations assembled in a stack so as to form a stator core of this invention, the core having a central bore and having a plurality of radial slots extending therefrom adapted to receive coils of wire (not shown) constituting the motor windings, the core further has a receptacle or opening formed therein for reception of a secondary coil.

Referring now to the drawings, a stator assembly, as generally indicated at 1, of this invention is shown to comprise a stator core 5 made up of a stack of laminations 7 of suitable, plate-like, ferromagnetic material.

Each lamination 7 is shown to have a main or central opening 9 therethrough and a plurality of notches 10 spaced at substantially equal angular intervals around opening 9. The notches are shown to be blind notches opening into central opening 9 and extending generally radially therefrom with generally T-shaped teeth therebetween. When laminations 7 are assembled together to form stack or core 5, notches 10 form a plurality of slots extending longitudinally through the core for reception of coils of wire (not shown) which constitute the motor windings of the stator assembly. Of course, main openings 9 are aligned so as to be coaxial and thus form a main bore 12 for reception of a rotor assembly (not shown) rotatable within the bore.

In accordance with this invention, a receptacle or opening, as generally indicated at 13, is also provided in laminations 7 for reception of a coil of wire C which constitutes a secondary coil (e.g., a choking coil, an auto-transformer coil, or the like). Receptacle 13 is shown to be formed by a pair of spaced notches or openings 15a, 15b provided in each lamination 7 with a portion 17 of each lamination therebetween. When assembled in a stack, the spaced openings 15a, 15b form a pair of side-by-side slots extending longitudinally through the core generally parallel to the longitudinal centerline of bore 12. Coil C may thus be readily placed in receptacle 13 by placing one side of the coil in opening 15a and the other side of the coil in opening 15b with the lamination portions 17 disposed between the coil portions and thus constituting a core for secondary coil C.

Further in accordance with this invention, core assembly 5 includes a bar 19 made of a plurality of laminations of suitable magnetic material secured together in a stack. As shown in FIG. 1, bar 19 is so structured as to fit across the top ends of laminations 7 on the outside of coil C and to engage the upper ends of the outer ends of the laminations and portion 17 thereby to close openings 15a and 15b. Bar 19 is secured to core 5 by fasteners 21. It will thus be appreciated that bar 19 serves to close the magnetic circuit of coil C after the coil has been placed in receptacle 13. It will be understood, however, that in accordance with this invention, coil C need not be enclosed. In any event, all portions of the laminations 7 may be formed in a progressive die in a conventional manner.

In accordance with this invention, the axis about which secondary coil C is wound may be oriented in any desired direction. In considering the axes indicated X-Y-Z, axis X is shown to extend in a direction generally parallel to the central axis of bore 12 (i.e., parallel to the axis of the stator assembly 1), and axes Y and Z are perpendicular to axis X and to each other. As shown in FIG. 1, the axis about which coil C is wound extends parallel to (or coincides with) axis Z and is thus perpendicular to axis X.

Figure 2:
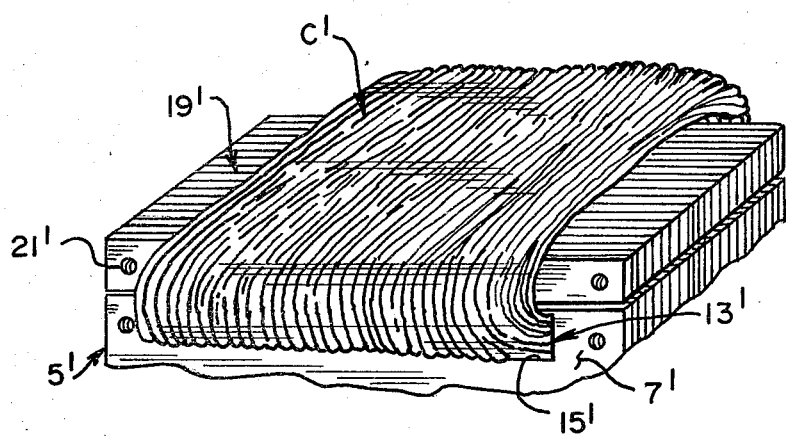
FIG. 2 is a perspective view of the upper portion of a stator core assembly generally similar to that illustrated in FIG. 1 but in which the axis of the secondary coil is wound extends in a transverse direction relative to the longitudinal axis of the central bore rather than perpendicular to a radial axis of the central bore as shown in FIG. 1.

In FIG. 2, another embodiment of the stator core assembly of this invention is generally indicated at 5' with the "primed" reference characters indicating parts of core assembly 5' which are essentially similar to the corresponding parts heretofore described in regard to core assembly 5. As shown, receptacle 13' differs from receptacle 13 in that it is composed of a single large slot 15' which extends longitudinal through core 5' at the upper end thereof. As shown, the axis about which coil C' is wound is generally parallel to axis Y which extends transversely with respect to bore 12. Bar 19' is shown to extend through the central opening of coil C' and is secured to laminations 7' by fasteners 21' so as to constitute a core for coil C'.

Regardless of the orientation of coil C or C' relative to core 5 or 5', the flux of the coils tends to lock itself in the upper portion of the core adjacent receptacle 13 or 13' substantially without disturbing the motor flux generated by the motor windings (not shown) disposed in slots 10. To facilitate closing the lines of flux generated by coil C on themselves, a slot 23 is provided in each lamination 7 intermediate receptacle 13 and the motor windings (i.e., the upper ends of slots 10). In addition, blind slots 25 are provided in the side edges of laminations 7 intermediate receptacle 13 and the upper ends of slots 11 thereby to cooperate with slot 23 so as to channel the flux of coil C without appreciably disturbing the flux of the motor.

By providing a stator assembly in which only one stack of laminations is required to serve as the core for both the main windings of the motor and for secondary coil C, it will be noted that the laminations for both the main windings and the secondary coil may be punched in a single die-forming operation. Additional, stacking of the laminations for both coils, as well is insulating the coils, is efficiently carried out in a single operation thus resulting in a substantial savings of material and labor in manufacturing a motor made in accordance with this invention. It will also be appreciated that a motor incorporating a stator assembly 1 of this invention is relatively compact.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A stator assembly for an alternating current electric motor having a secondary coil, such as an autotransformer coil or a choke coil, for varying the operating characteristics of the motor, said second coil being substantially magnetically separate from the main windings of the motor, said motor further having a single core which serves both as the core for the main windings of said motor and as the magnetic core of said second coil, said core comprising a plurality of laminations made of suitable magnetic material, each of said laminations being so structured so that with said laminations assembled in a stack they form a bore for reception of a rotor and means for receiving coils of wire which constitute the main windings of said motor, each of said laminations further having one or more openings therein so that upon said laminations being stacked in said stack said openings form a receptacle for reception of said secondary coil, said core further including means enabling said secondary coil to operate substantially without disturbing the flux of said main windings of the motor.

2. A stator assembly as set forth in claim 1 wherein each of said laminations has means integral therewith disposed within said receptacle when said laminations are assembled in said coil so as to constitute a core for said secondary coil, this last said core being integral with said stator core.

3. A stator assembly as set forth in claim 1 further comprising means of suitable magnetic material for closing said receptacle after installation of said secondary coil for completing a magnetic circuit.

4. A stator assembly as set forth in claim 1 wherein said means enabling said secondary coil to operate substantially without disturbing the flux of the main winding comprises one or more openings in each of said laminations disposed generally between said motor windings and said secondary coil for channeling the flux of said secondary coil without appreciably disturbing the flux generated by said main windings.

5. A stator assembly as set forth in claim 1 wherein said secondary coil is wound about an axis which extends in generally radial direction with respect to said bore.

6. A stator assembly as set forth in claim 1 wherein said secondary coil is wound about an axis which extends along an axis parallel to a transverse axis of said bore.

7. A stator core for a multi-speed AC electric motor in which the operating speed of the motor is controlled by a choke or secondary coil, said stator core being comprised by a plurality of laminations of suitable magnetic material formed into a stack so as to constitute said core, each of said laminations having a central opening therein to constitute the bore of said core for reception of a rotor, a plurality of notches formed in said laminations at substantially equal angular intervals around said central opening so as to form slots extending through said core for reception of a plurality of coils of wire which constitute the main windings of said motor, and one or more other openings in each of said laminations which form a receptacle in said core for reception of a coil of wire which constitutes said choke coil whereby said stack of laminations constitutes a common core for both the motor windings and said secondary coil, said core further including means enabling said secondary coil to operate substantially without disturbing the flux of said main windings of the motor.

8. In a stator assembly for a multi-speed motor in which the speed of the motor is controlled by a secondary coil, said stator assembly including a plurality of laminations of suitable magnetic material arranged in a stack to form a core, each of said laminations having a main opening and a plurality of notches spaced at substantially equal angular intervals around said main opening so that with said laminations arranged in a stack, said main openings form a central bore and said notches form slots extending longitudinally through the core wherein the improvement comprises means formed in each of said laminations for constituting a receptacle adapted to receive a coil of wire constituting said secondary coil when said laminations are assembled in a stack, said laminations serving as the core for said secondary coil, each of said laminations further having a at least one other opening therethrough disposed generally between said slots and said secondary coil so as to permit operation of the magnetic circuit generated by the secondary coil substantially without disturbance of the flux of said motor, said other openings of said laminations forming a closed slot extending generally parallel to said receptacle intermediate said receptacle and said slots, each of said laminations each having a notch in each side thereof, said notches being disposed intermediate said receptacle and said slots and cooperating with said closed slot for enabling said secondary coil to operate substantially without disturbing the flux of said motor.

* * * * *